US008805072B2

(12) United States Patent
Kakino

(10) Patent No.: US 8,805,072 B2
(45) Date of Patent: Aug. 12, 2014

(54) BINARIZED THRESHOLD VALUE DETERMINATION DEVICE, METHOD THEREOF, AND IMAGE PROCESSING DEVICE

(75) Inventor: Tomonari Kakino, Fuji (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 225 days.

(21) Appl. No.: 13/534,275

(22) Filed: Jun. 27, 2012

(65) Prior Publication Data

US 2013/0016906 A1   Jan. 17, 2013

(30) Foreign Application Priority Data

Jul. 14, 2011 (JP) .................................. 2011-155971

(51) Int. Cl.
*G06K 9/38* (2006.01)
(52) U.S. Cl.
USPC ........... 382/172; 382/100; 382/169; 382/171; 382/173
(58) Field of Classification Search
USPC .......................... 382/100, 169, 171, 172, 173
See application file for complete search history.

(56) References Cited

U.S. PATENT DOCUMENTS

| 5,878,163 | A | * | 3/1999 | Stephan et al. | ............... 382/172 |
| 2002/0037103 | A1 | * | 3/2002 | Hong et al. | .................... 382/173 |

FOREIGN PATENT DOCUMENTS

| JP | 2004-104318 | 4/2004 |
| JP | 2006-026183 | 2/2006 |

OTHER PUBLICATIONS

Otsu; "A Threshold Selection Method from Gray-Level Histograms"; IEEE Transactions on Systems, Man, and Cyber Netics, vol. SMC-9, No. 1; Jan. 1979, pp. 62-66.*
Zhu et. al, "A Fast 2D Otsu Thresholding Algorithm based on Improved Histogram"; Chinese Conference on Pattern Recognition.*
First Office Action of Reasons for Rejection for Japanese Patent Application No. 2011-155971 Dated Sep. 24, 2013, 6 pgs.
Taiichi Saito. "Method for Setting a Binary Threshold, based on Likelihood Standard Calibrated in Density Gradation", Proceeding of the Electronics, Information and Communication Engineers, D-II, Japan, The Institute of Electronics, Information and Communication Engineers, Jun. 1997, vol. J80-D-II, No. 6, p. 1343-1351.
Kurita et al, Maximum Likelihood Thresholding Based on Population Mixture Models, Pattern Recognition, vol. 25, No. 10, pp. 1231-1240, 1992, (published before this application Jul. 2011).

* cited by examiner

*Primary Examiner* — Chan Park
*Assistant Examiner* — Eueng-Nan Yeh
(74) *Attorney, Agent, or Firm* — Amin, Turocy & Watson, LLP

(57) ABSTRACT

According to one embodiment, a binarized threshold value determination device includes, a creating unit, an average gray level value calculation unit, a parameter calculation unit, a correction unit, a selection unit, and a determination unit. The correction unit configures to correct the gray level value of the gray level histogram on the basis of the gray level conversion parameter which is calculated in the parameter calculation unit. The selection unit configures to select a temporary threshold value from the gray level histogram of which the gray level value is corrected in the correction unit. The determination unit configures to determine a threshold value for binarizing each of the pixels by performing an inversion correction with respect to the temporary threshold value which is selected in the selection unit, on the basis of the gray level conversion parameter which is calculated in the parameter calculation unit.

18 Claims, 7 Drawing Sheets

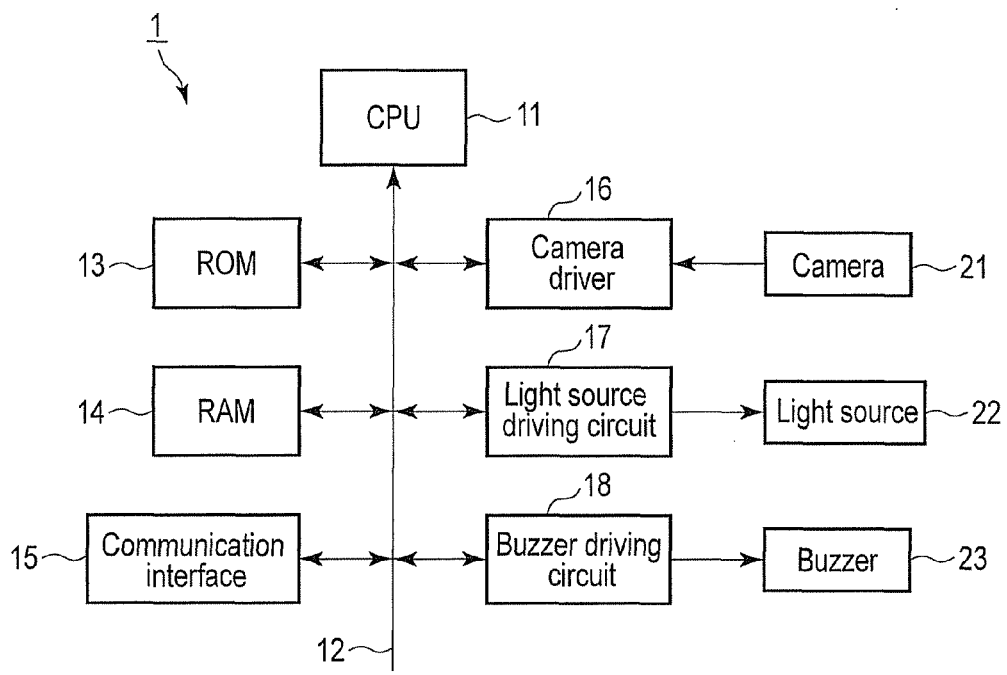
F I G. 1
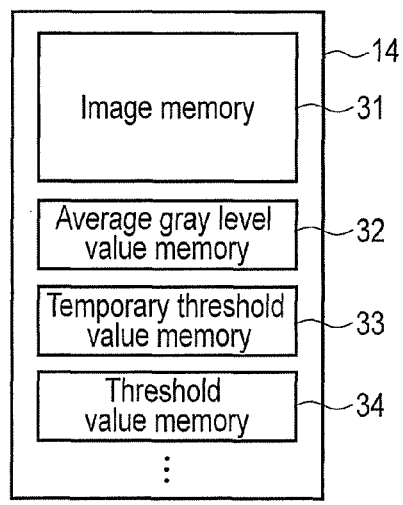
F I G. 2

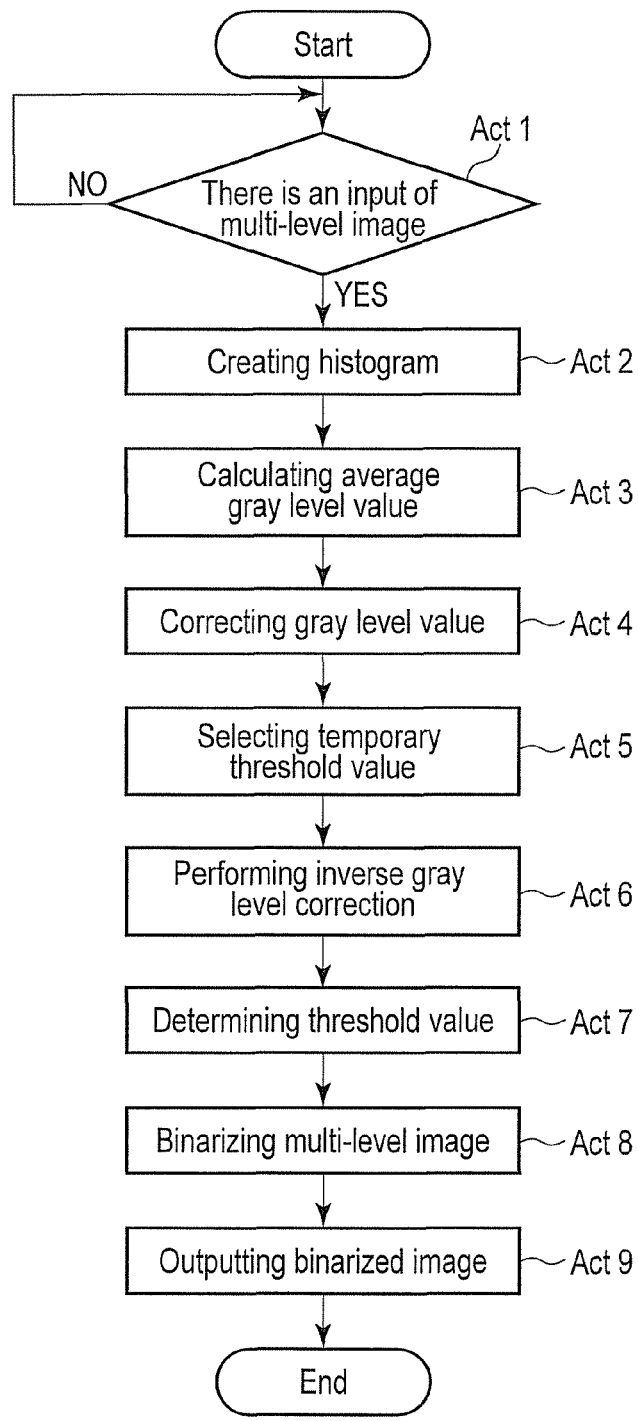
F I G. 4

|  |  | Gray level before correction | | | | | | | | |
|---|---|---|---|---|---|---|---|---|---|---|
|  |  | 0 | 1 | 2 | 3 | ... | 100 | ... | 253 | 254 | 255 |
| Average gray level value | 0 | 0 | 137 | 148 | 155 | ... | 229 | ... | 254 | 254 | 255 |
|  | 1 | 0 | 127 | 139 | 146 | ... | 226 | ... | 254 | 254 | 255 |
|  | 2 | 0 | 115 | 127 | 135 | ... | 223 | ... | 254 | 254 | 255 |
|  | 3 | 0 | 107 | 119 | 127 | ... | 220 | ... | 254 | 254 | 255 |
|  | ... | ... | ... | ... | ... | ... | ... | ... | ... | ... | ... |
|  | 100 | 0 | 4 | 7 | 9 | ... | 127 | ... | 253 | 254 | 255 |
|  | ... | ... | ... | ... | ... | ... | ... | ... | ... | ... | ... |
|  | 253 | 0 | 0 | 0 | 0 | ... | 0 | ... | 127 | 180 | 255 |
|  | 254 | 0 | 0 | 0 | 0 | ... | 0 | ... | 63 | 127 | 255 |
|  | 255 | 0 | 0 | 0 | 0 | ... | 0 | ... | 0 | 5 | 255 |

70

F I G. 10

US 8,805,072 B2

BINARIZED THRESHOLD VALUE DETERMINATION DEVICE, METHOD THEREOF, AND IMAGE PROCESSING DEVICE

CROSS-REFERENCE TO RELATED APPLICATIONS

This application is based upon and claims the benefit of priority from prior Japanese Patent Application No. 2011-155971, filed Jul. 14, 2011, the entire contents of which are incorporated herein by reference.

FIELD

Embodiments described herein relate generally to a device of determining a binarized threshold value for converting a multi-level image to a binarized image, a method thereof, and an image processing device.

BACKGROUND

An image processing technology is provided in which a multi-level image (a gray-scale image) is binarized, and is converted to a binarized image, a sign such as a barcode, or two-dimensional data code is decoded from the binarized image, or characters are recognized. In the technology, it is required to select an appropriate binarized threshold value. In general, a method is used in which a binarized threshold value is selected by a maximum likelihood threshold selection method, using a gray level histogram.

As one of the maximum likelihood threshold selection methods, there is Otsu's threshold selection method. In this selection method, it is assumed that a gray level value of a target region, and the gray level value of a background in the multi-level image both follow a normal variance. For this reason, there is a problem in that it is difficult to obtain an appropriate binarized threshold value when the variance of a grayscale value of the target region, and the variance of the grayscale value of the background are extremely different, or when the number of pixels in the target region, and the number of pixels in the background region are extremely different.

BRIEF DESCRIPTION OF THE DRAWINGS

FIG. 1 is a block diagram which shows a configuration of the main parts of an image processing device according to one embodiment.

FIG. 2 shows main memory areas which are formed in a RAM of the image processing device.

FIG. 4 is a flowchart which shows a procedure of information processing which is executed by the CPU of the image processing device according to the binarized threshold value determination program.

FIG. 10 shows an example of a gray level conversion table as another example of the gamma correction.

DETAILED DESCRIPTION

Figure 3:
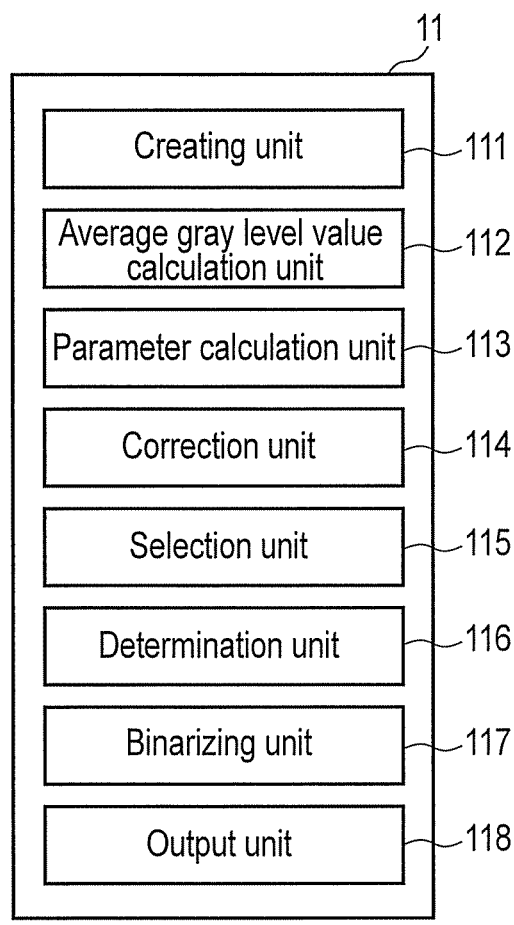
FIG. 3 shows functions which are realized by a CPU of the image processing device according to a binarized threshold value determination program.

In general, according to one embodiment, a binarized threshold value determination device includes a creating unit, an average gray level value calculation unit, a parameter calculation unit, a correction unit, a selection unit, and a determination unit.

The creating unit configures to create a gray level histogram from a gray level value of each pixel in a multi-level image. The average gray level value calculation unit configures to calculate an average gray level value of each pixel in the multi-level image. The parameter calculation unit configures to calculate a gray level conversion parameter for converting the average gray level value which is calculated in the calculation unit to the median gray level value of each of the pixels. The correction unit configures to correct the gray level value of the gray level histogram on the basis of the gray level conversion parameter which is calculated in the parameter calculation unit. The selection unit configures to select the temporary threshold value from the gray level histogram of which the gray level value is corrected in the correction unit. The determination unit configures to determine the threshold value for binarizing each of the pixels by performing inverse correction with respect to the temporary threshold value which is selected in the selection unit on the basis of the gray level conversion parameter which is calculated in the parameter calculation unit.

According to the embodiment, an image processing unit 1 which extracts a binarized image of a two dimensional data code from an image which is photographed in an imaging unit, and outputs the image to a POS (Point of Sales) terminal is exemplified.

FIG. 1 is a block diagram which shows a configuration of main parts of the image processing device 1. As shown in FIG. 1, the image processing device 1 mounts a CPU (Central Processing Unit) 11 as a processor which plays a role as a center of a controller. The controller of the image processing device 1 is configured by connecting a ROM (Read Only Memory) 13, a RAM (Random Access Memory) 14, a communication interface 15, a camera driver 16, a light source driving circuit 17, and a buzzer driving circuit 18 to the CPU 11 through a bus line 12 such as an address bus, and a data bus.

The camera driver 16 controls driving of a camera 21 as an imaging unit. The camera 21 photographs an image including the two-dimensional data code, and uses, for example, a CCD (Charge Coupled Device) camera. The camera driver 16 takes in data of the multi-level image (grayscale image) which is photographed by the camera 21, and records the data in an image memory 31.

The light source driving circuit 17 outputs a driving signal for turning on or off a light source 22 to the light source 22. The light source 22 is to irradiate a region to be photographed by the camera 21 with light, and for example, an LED is used.

The buzzer driving circuit 18 outputs a driving signal for ringing the buzzer 23 thereto. The buzzer 23 rings a "beep" sound when, for example, the two-dimensional data code is decoded in the POS terminal from a photographed image using the camera 21. Due to the sound, an operator recognizes that the two-dimensional data code is decoded.

The ROM 13 stores fixed data such as a program, or a set data in advance. A binarized threshold value determining program is included in the program.

As shown in FIG. 2, the RAM 14 includes the image memory 31, an average gray level value memory 32, a temporary threshold value memory 33, a threshold value memory 34, or the like. The image memory 31, the average gray level value memory 32, the temporary threshold value memory 33, the threshold value memory 34, or the like are used by the CPU 11 in data processing according to the binarized threshold value determining program.

The communication interface 15 is connected to the POS terminal through a communication cable. The communication interface 15 is in charge of data communication between the image processing device 1 and the POS terminal.

As shown in FIG. 3, the CPU 11 executes functions as a creating unit 111, an average gray level value calculation unit 112, a parameter calculation unit 113, a correction unit 114, a selection unit 115, a determination unit 116, a binarizing unit 117, and an output unit 118. These functions are executed according the binarized threshold value determining program.

FIG. 4 is a flowchart which shows a procedure of information processing which is executed according to the binarized threshold value determining program by the CPU 11. Each function shown in FIG. 3 is described according to the flowchart.

First, the CPU 11 waits for inputting of a multi-level image (Act 1). When data of the multi-level image which is photographed using the camera 21 is recorded in the image memory 31, the CPU 11 recognizes that there is an input of the multi-level image.

When the multi-level image is input (YES in Act 1), the CPU 11 calculates the gray level value of the entire pixel of the multi-level image. In addition, the CPU 11 creates a gray level histogram in which the number of pixels is counted in each gray level value (Act 2: creating unit 111).

In addition, the CPU 11 calculates an average value Avg of a gray level which is calculated with respect to the entire pixel using the following expression (1(Act 3: average gray level value calculation unit 112). In addition, in the expression (1), N is the number of entire pixel, and I (i) is the gray level value. The calculated average gray level value Avg is stored in the average gray level value memory 32.

$$Avg = \frac{1}{N}\sum_{i=1}^{N} I(i) \quad (1)$$

Subsequently, the CPU 11 corrects each gray level value of the gray level histogram which is created in processing of Act 2 (Act 4). Specifically, the average gray level value Avg of the multi-level image which is calculated in processing of Act 3 is corrected so as to be a gray level median value of each pixel which configures the multi-level image. A gamma correction is used for such a correction.

In the embodiment, a gamma correction of a case where the multi-level image has 256 gray scales (gray level value: 0 to 255) is described. First, the CPU 11 calculates a variable coefficient γ as a gray level conversion parameter of the gamma correction using the following expression (2) (parameter calculation unit 113).

$$\gamma = \log_{0.5} \frac{Avg}{255} \quad (2)$$

Subsequently, the CPU 11 corrects each gray level value of the gray level histogram using the following expression (3) using the variable coefficient γ (correction unit 114). In addition, in the expression (3), In denotes a gray level value before correction, and Out denotes a gray level value after correction.

$$Out = In^{\frac{1}{\gamma}} \quad (3)$$

In this manner, when each gray level value of the gray level histogram is converted to the gray level value after correcting due to the gamma correction using the above expression (3), the CPU 11 selects a temporary threshold value from the gray level histogram after correcting the gray level value (Act 5: selection unit 115). The selected temporary threshold value is stored in the temporary threshold value memory 33.

When selecting the temporary threshold value, the maximum likelihood threshold selection method is used. The maximum likelihood threshold selection method is a method of selecting a threshold value such that the gray level value of a target region in the multi-level image, and the gray level value of the background are assumed to follow a normal variance together, and the likelihood is maximized. According to the embodiment, Otsu's threshold selection method is adopted. The Otsu's threshold selection method is a method of selecting a threshold value in which it is assumed that a variance in each class has a different mean value from each other, however, has the same variance as each other, and the likelihood of a conditional variance is maximized.

The temporary threshold value is determined from a gray level histogram of which the gray level value is corrected using the gamma correction. For this reason, the temporary threshold value cannot be applied to a threshold value for binarizing the multi-level image which is formed of each pixel of the gray level value before correction. Therefore, the CPU 11 executes an inverse correction of the gray level correction with respect to the temporary threshold value, and determines the binarized threshold value (Act 6: determination unit 116). For such an inverse correction, an inverse gamma correction by the following expression (4) is used. The binarized threshold value is stored in the threshold value memory 34 (Act 7).

$$Out = In^{\gamma} \quad (4)$$

Subsequently, the CPU 11 binarizes the multi-level image which is developed in the image memory 31 using the binarized threshold value of the threshold value memory 34 (Act 8: binarizing unit 117). In addition, the CPU 11 outputs the binarized image which is obtained by performing the binarization to the POS terminal through the communication interface 15 (Act 9: output unit 118).

Figure 5:
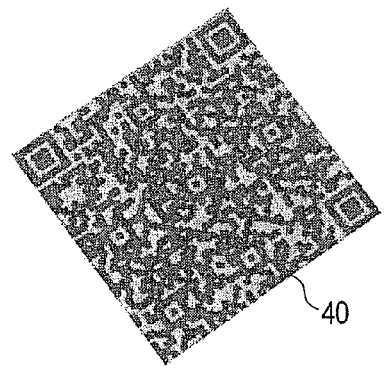
FIG. 5 shows an original image of a two-dimensional data code which is photographed using a camera of the image processing device.
Figure 8:
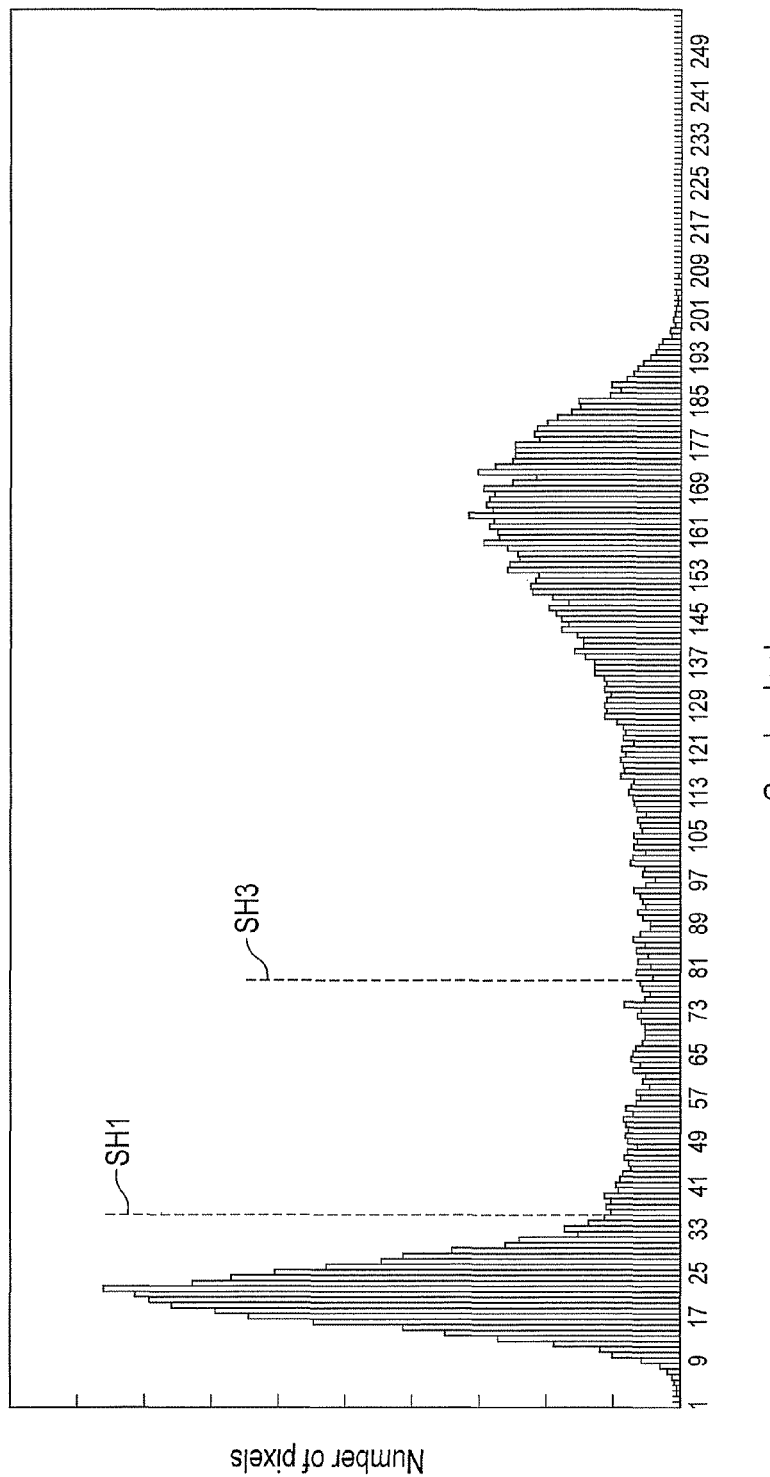
FIG. 8 shows a gray level histogram with respect to the original image of FIG. 5, a binarized threshold value which is selected by the method in the related art, and a binarized threshold value which is selected by the method according to the embodiment.

FIG. 5 is an example of an original image 40 of the two-dimensional data code which is photographed using the camera 21. The image processing device 1 creates the gray level histogram from the gray level value of each pixel in the image 40. The image 40 is a multi-level image of which a white color of the background became gray. For this reason, the gray level histogram becomes a histogram shown in FIG. 8. In FIG. 8, the height from the gray levels 9 to approximately 33 is a variance of a grayscale value of black color as a target region.

The height from the gray level values 129 to approximately 193 is a variance of a grayscale value of white color as a background region.

Figure 6:
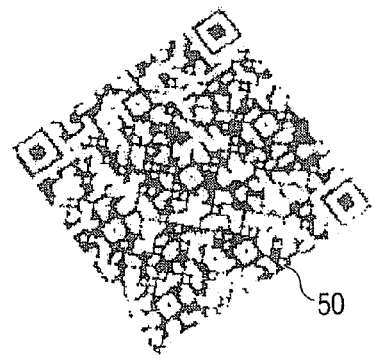
FIG. 6 shows a binarized image binarized by a binarized threshold value which is selected by a method in the related art with respect to the original image in FIG. 5.

In this manner, when the binarized threshold value is selected by Otsu's threshold selection method using the gray level histogram in which a variance of the grayscale value in the target region, and a variance of the grayscale value in the background are extremely different, the threshold values becomes SH1 shown in FIG. 8. In addition, when the original image 40 is binarized using the threshold value SH1, an obtained binarized image 50 becomes a blurry image as shown in FIG. 6. That is, the threshold value SH1 is an incorrect value.

Figure 9:
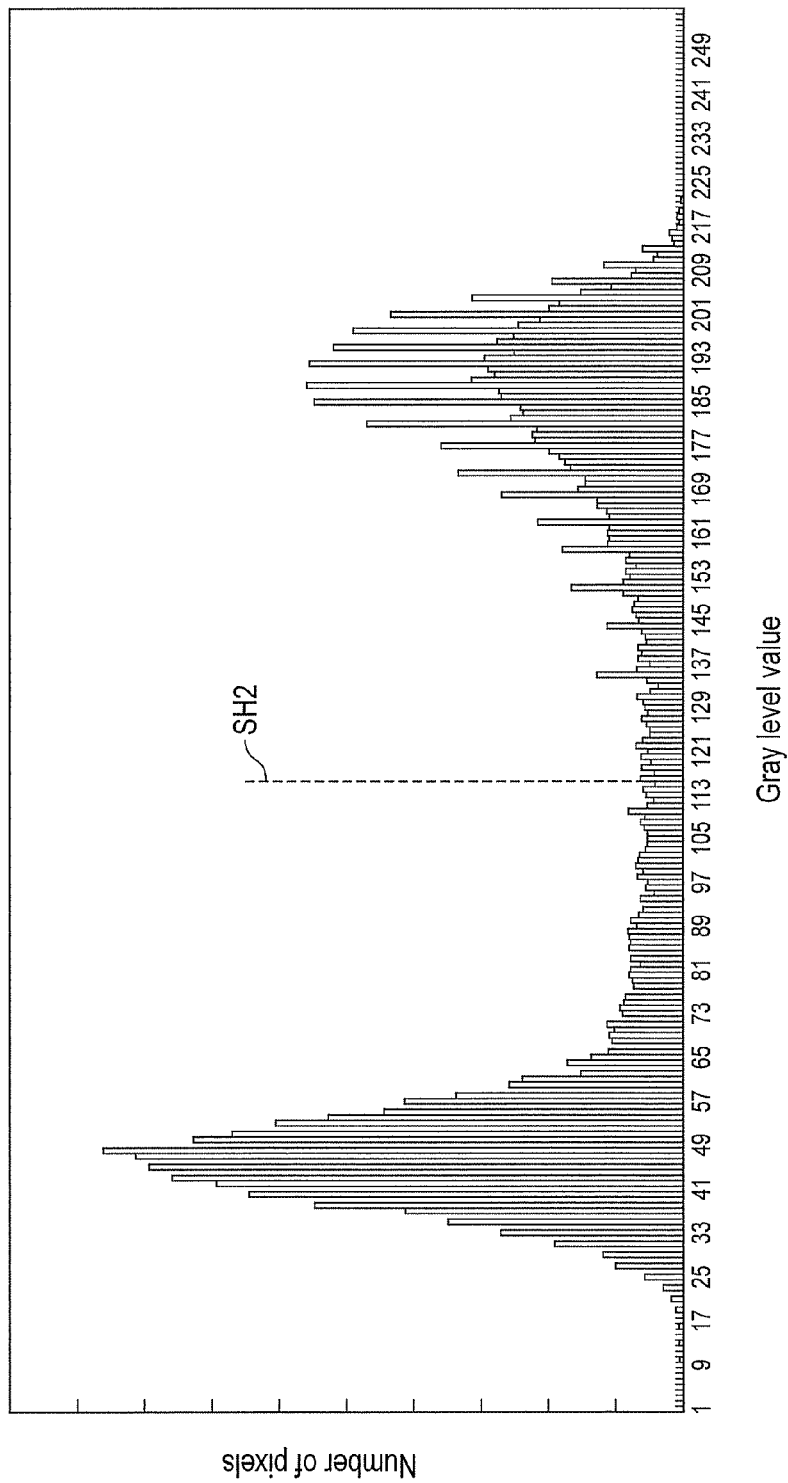
FIG. 9 shows a histogram after performing a gamma correction of the gray level histogram with respect to the original image in FIG. 5, and a temporary threshold value.

According to the embodiment, the image processing device 1 creates a gray level histogram of the original image 40 with multiple levels, and calculates an average gray level value of each pixel in the original image 40. In addition, the image processing device 1 calculates the variable coefficient γ as a gray level conversion parameter for converting the average gray level value to the gray level median value of each pixel. In addition, the image processing device 1 corrects the gray level value of the gray level histogram on the basis of the variable coefficient γ. Thereafter, the image processing device 1 selects a temporary threshold value SH2 by Otsu's threshold selection method from the gray level histogram of which the gray level value is corrected. The temporary threshold value SH2 becomes a value as shown in FIG. 9.

Figure 7:
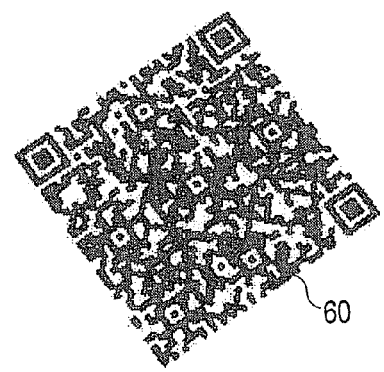
FIG. 7 shows a binarized image binarized by a binarized threshold value which is selected by a method according to the embodiment with respect to the original image in FIG. 5.

The image processing device 1 determines a binarized threshold value SH3 by performing an inverse correction of the temporary threshold value SH2 on the basis of the variable coefficient γ. The binarized threshold value SH3 becomes a value shown in FIG. 8. A binarized image 60 which is binarized using the binarized threshold value SH3 becomes an image in which the target region and the background region are easily identified as shown in FIG. 7.

In this manner, according to the embodiment, even when a variance of the grayscale value of the target region, and a variance of the grayscale value of the background region are extremely different, it is possible to obtain an appropriate binarized threshold value SH3 for converting the original image 40 as the multi-level image to the binarized image 60. Such an effect can be obtained even when the number of pixels in the target region and the number of pixels in the background region are extremely different.

Accordingly, the image processing device 1 which binarizes a multi-level image using the binarized threshold value SH3 is able to obtain a binarized image in which the target region and the background region are easily identified.

Hereinafter, other embodiments will be described.

For example, in the embodiment, when a multi-level image is input, a gray level histogram is firstly created, and an average gray level value Avg is calculated after that. Regarding this processing procedure, it is possible to calculate the average gray level value Avg, first, and to subsequently create a gray level histogram.

In addition, in the embodiment, the average gray level value Avg was calculated using the expression (1). However, it is also possible to calculate the average gray level value Avg from the gray level histogram.

Further, in the embodiment, the gamma correction was used to correct the gray level value of the gray level histogram. However, it is also possible to correct the gray level using a gray level conversion method which shows the equivalent effect as that of the gamma correction. For example, the gray level value of the gray level histogram can also be corrected using a gray level correction table 70 as shown in FIG. 10.

In the gray level correction table 70, the vertical axis denotes an average gray level value, and the horizontal axis denotes a gray level value before correction. For example, as gray level values after conversion of the gray level values "0" to "255" with respect to the average gray level value "100", "0, 4, 7, 9, . . . , 127, . . . , 253, 254, and 255" are set. Here, it is a characteristic of the table 70 that the gray level value "100" before correction is corrected to "127" as the gray level median value of a pixel, when the average gray level value is "100". That is, the converted gray level values "0, 4, 7, 9, . . . , 127, . . . , 253, 254, and 255" are defined as gray level conversion parameters with respect to the average gray level value "100".

In addition, in an inverse gray level correction, the converted gray level values "0, 4, 7, 9, . . . , 127, . . . , 253, 254, and 255" when the average gray level value is "100" are set as binarized threshold values for binarizing the gray level value before correction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
   a creating unit configured to create a gray level histogram from a gray level value of each pixel in a multi-level image;
   an average gray level value calculation unit configured to calculate an average gray level value of each pixel in the multi-level image;
   a parameter calculation unit configured to calculate a gray level conversion parameter for converting the average gray level value which is calculated in the average gray level value calculation unit to a gray level median value of each of the pixels;
   a correction unit configured to correct the gray level values of the gray level histogram on the basis of the a gray level conversion parameter which is calculated in the parameter calculation unit;
   a selection unit configured to select a temporary threshold value from the gray level histogram of which the gray level values are corrected in the correction unit;
   a determination unit configured to determine a threshold value for binarizing each of the pixels by performing an inverse correction with respect to the temporary threshold value which is selected in the selection unit on the basis of the gray level conversion parameter obtained in the parameter calculation unit; and
   a binarizing unit configured to binarize the multi-level image using the threshold value which is determined in the determination unit.

2. The device of claim 1,
   wherein the correction unit corrects the gray level values of the gray level histogram using a gamma correction.

3. The device of claim 2,
   wherein the determination unit determines the threshold value for binarizing each of the pixels by performing an inversion correction with respect to the temporary threshold value using an inverse gamma correction.

4. The device of claim 1,
wherein the selection unit selects the temporary threshold value using a maximum likelihood threshold selection method.

5. The device of claim 4,
wherein the maximum likelihood threshold selection method is Otsu's threshold selection method.

6. The device of claim 1,
wherein the parameter calculation unit calculates the gray level conversion parameter γ using the following expression when the average gray level value is set to an Avg.

$$\gamma = \log_{0.5} \frac{Avg}{255}.$$

7. The device of claim 6,
wherein the correction unit corrects a gray level value of the gray level histogram by the following expression using the gray level conversion parameter γ when the gray level value before correction is set to In, and the gray level value after correction is set to Out.

$$Out = In^{\frac{1}{\gamma}}.$$

8. The device of claim 1, further comprising:
an output unit configured to output a binarized image which is obtained by performing binarization in the binarizing unit.

9. The device of claim 8,
wherein the output unit outputs the binarized image to a Point of Sales terminal.

10. A binarized threshold value determination device comprising:
a creating unit configured to create a gray level histogram from a gray level value of each pixel in a multi-level image;
an average gray level value calculation unit configured to calculate an average gray level value of each pixel in the multi-level image;
a parameter calculation unit configured to calculate a gray level conversion parameter for converting the average gray level value which is calculated in the average gray level value calculation unit to a gray level median value of each of the pixels;
a correction unit configured to correct gray level values of the gray level histogram on the basis of the gray level conversion parameter which is calculated in the parameter calculation unit;
a selection unit configured to select a temporary threshold value from the gray level histogram of which the gray level values are corrected in the correction unit; and
a determination unit configured to determine a threshold value for binarizing each of the pixels by performing an inverse correction with respect to the temporary threshold value which is selected in the selection unit on the basis of the gray level conversion parameter obtained in the parameter calculation unit.

11. The device of claim 10,
wherein, the correction unit corrects the gray level values of the gray level histogram using a gamma correction.

12. The device of claim 11,
wherein the determination unit determines the threshold value for binarizing each of the pixels by performing the inverse correction with respect to the temporary threshold value using an inverse gamma correction.

13. The device of claim 10,
wherein the selection unit selects the temporary threshold value using a maximum likelihood threshold selection method.

14. The device of claim 13,
wherein the maximum likelihood threshold selection method is Otsu's threshold selection method.

15. The device of claim 10,
wherein the parameter calculation unit calculates the gray level conversion parameter γ using the following expression when the average gray level value is set to an Avg.

$$\gamma = \log_{0.5} \frac{Avg}{255}.$$

16. The device of claim 15,
wherein the correction unit corrects the gray level values of the gray level histogram by the following expression using the gray level conversion parameter γ when the gray level value before correction is set to In, and the gray level value after correction is set to Out.

$$Out = In^{\frac{1}{\gamma}}.$$

17. A method of determining a binarized threshold value for obtaining a binarized image from a multi-level image, comprising:
creating a gray level histogram from a gray level value of each pixel in the multi-level image;
calculating an average gray level value of each pixel in the multi-level image;
calculating a gray level conversion parameter for converting the average gray level value to a gray level median value of each of the pixels;
correcting the gray level values of the gray level histogram on the basis of the gray level conversion parameter;
selecting a temporary threshold value from the gray level histogram of which the gray level values are corrected; and
determining a threshold value for binarizing each of the pixels by performing an inversion correction with respect to the temporary threshold value on the basis of the gray level conversion parameter.

18. The method of claim 17,
wherein the gray level values of the gray level histogram are corrected using a gamma correction.

\* \* \* \* \*